W. J. HILL.
Peach-Cutters.
No. 139,714. Patented June 10, 1873.
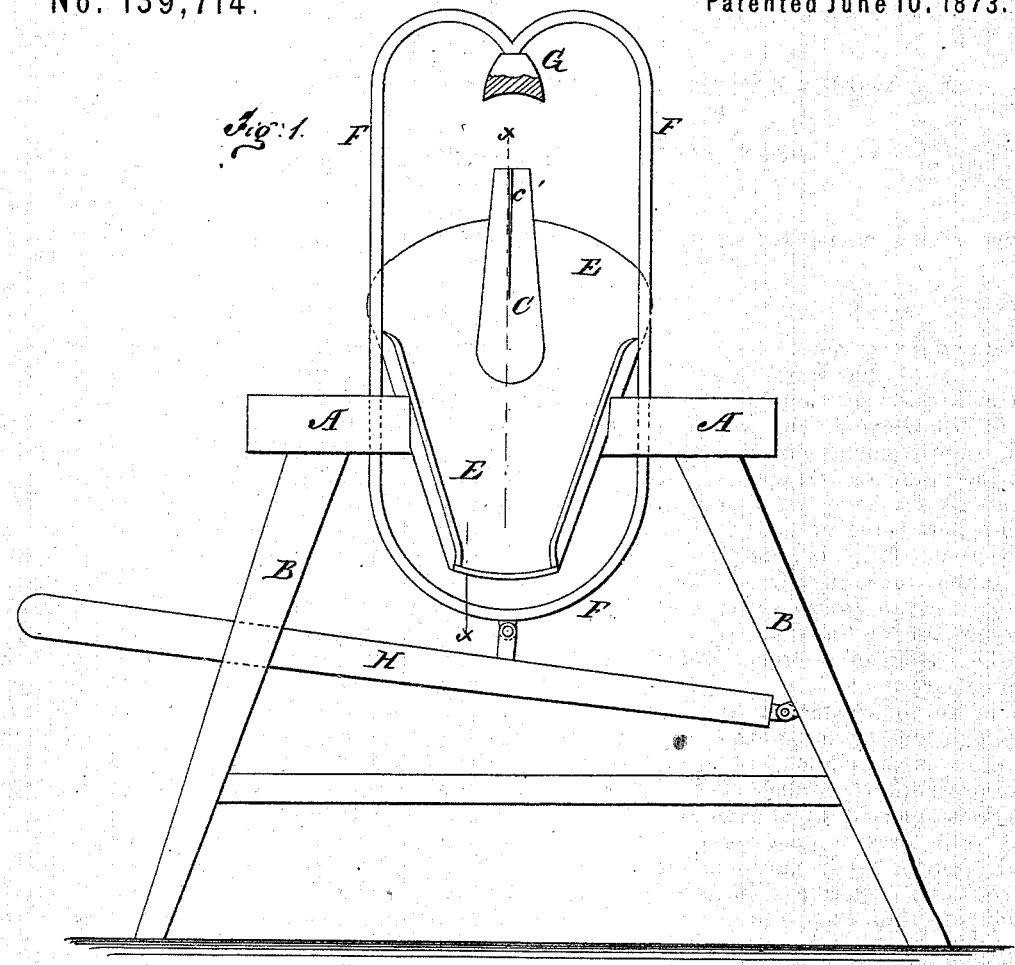
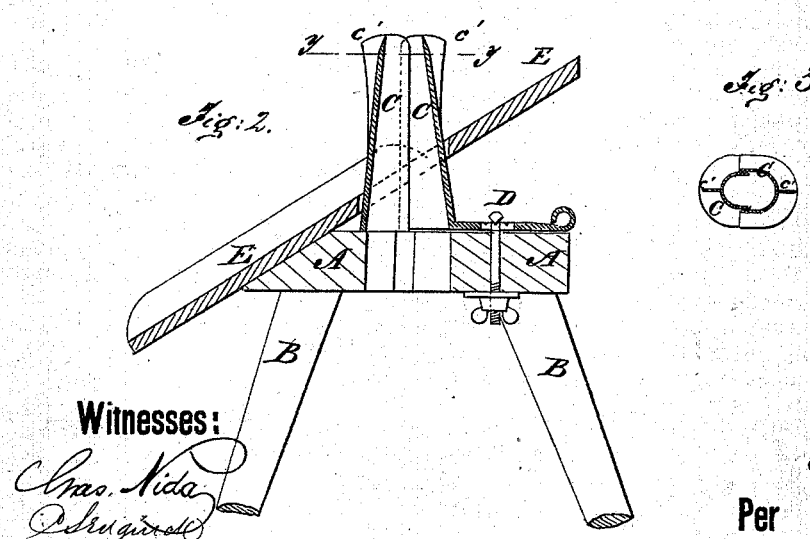
Witnesses:
Inventor:
W. J. Hill
Per
Attorneys.

UNITED STATES PATENT OFFICE.

WILLIAM J. HILL, OF FAYETTEVILLE, TENNESSEE.

IMPROVEMENT IN PEACH-CUTTERS.

Specification forming part of Letters Patent No. 139,714, dated June 10, 1873; application filed April 19, 1873.

*To all whom it may concern:*

Be it known that I, WILLIAM J. HILL, of Fayetteville, in the County of Lincoln and State of Tennessee, have invented a new and useful Improvement in Peach-Cutters, of which the following is a specification:

Figure 1 is a front view of my improved machine, part being broken away to show the construction. Fig. 2 is a detail section of the same taken through the line $x\ x$, Fig. 1. Fig. 3 is a detail cross-section of the cutters taken through the line $y\ y$, Fig. 2.

Similar letters of reference indicate corresponding parts.

The invention consists in the improvement of peach-cutters, as hereinafter described and pointed out in the claim.

A represents the table of the machine, which is supported upon legs B, of such a length as to raise it to a convenient height. C are the cutters, which are made in the form of halves of a tapering tube, the side edges of which overlap each other, and the lower ends of which are connected with the table A upon the opposite sides of a hole formed through the middle part of said table. One of the cutters C is stationary and the other is adjustable, having an outwardly-projecting arm formed upon its lower end, which lies upon the table A and is slotted to receive the bolt D, which passes down through the table, and is provided with a hand-nut so that the said cutter may be readily moved out and in to adjust the cutters to the size of the pits of the peaches to be operated upon. The bolt D has a cross-head formed upon its upper end, the arms of which are beveled to an edge upon their lower sides to take hold of notches formed in the arm of the cutter C, so as to hold said cutter firmly in place when adjusted. Upon the outer side of the upper or cutting ends of the cutter C are formed wing-cutters $c'$, to cut or divide the peach while the semi-tubular cutters remove the pits. The pits drop through the cavity of the cutters C into a receptacle placed beneath the table A, and the parts of the peach drop into the spout E, down which they slide into a receptacle placed beneath the lower end of said spout. The spout E is secured to the table A in an inclined position, and has a hole formed through it through which the cutters C pass. F is a loop which slides up and down through guide-holes or slots in the table A, and which is made of such a size as to receive the cutters C and spout E between its side bars. To the upper end of the loop F is attached a block, G, the face of which is concaved, to rest upon the peach and push it down upon the cutters C as the said loop F is drawn downward. To the lower end of the loop F is pivoted a lever, H, one end of which is pivoted to the frame of the machine, and its other end projects into such a position that it may be conveniently reached and operated by the operator.

In using the machine the peaches are laid blossom end downward upon the cutters C with one hand, in such a position that the seam of the peach may be in line with the wing or straight cutters $c'$, and the lever H is operated with the other hand to bring the block G down upon the peach. As the block G presses upon the peach with sufficient force to hold it in place, the first hand is removed from the peach and the block G is pressed down upon the edges of the cutters, the parts of the peach dropping into the spout E, and the pit sticking in the cavity of the cutters C until it is pushed out by the next pit.

Having thus described my invention, I claim as new and desire to secure by Letters Patent—

The combination of the block G, sliding loop F, lever H, cutters C $c'$, spout E, and table A B, with each other, substantially as herein shown and described.

WILLIAM J. HILL.

Witnesses:
J. B. HILL,
JOHN B. CORN.